March 22, 1966     W. G. GREEN     3,241,512
ANTI-FOULING, BARNACLES, ALGAE, ELIMINATOR
Filed Feb. 12, 1964     3 Sheets-Sheet 1
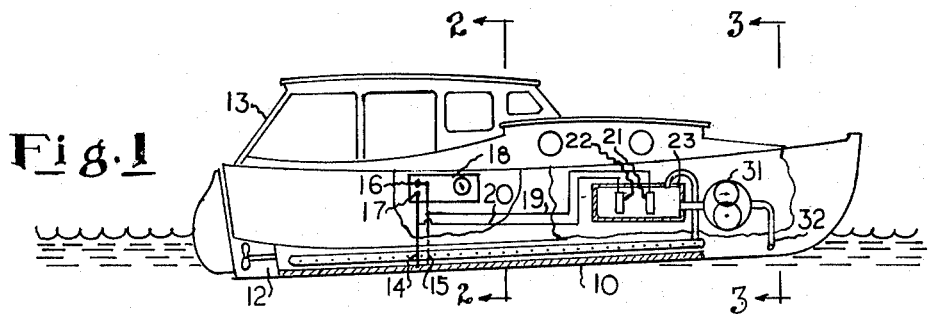
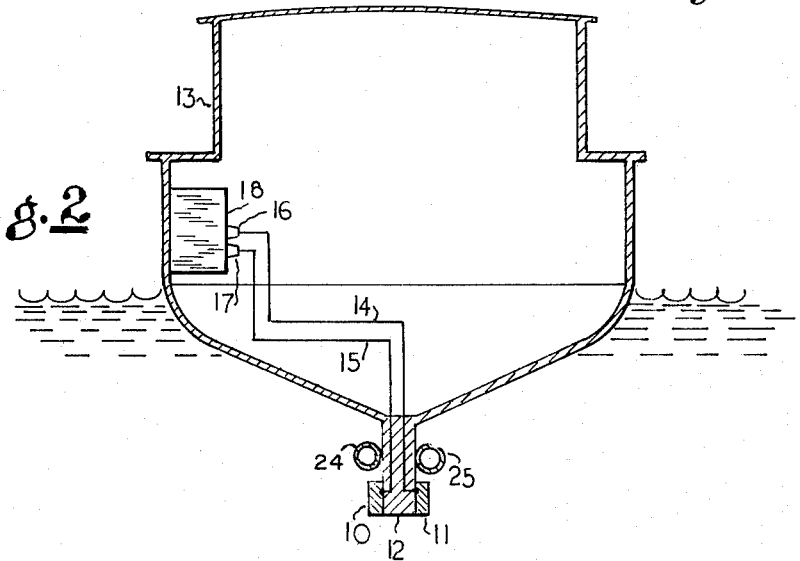
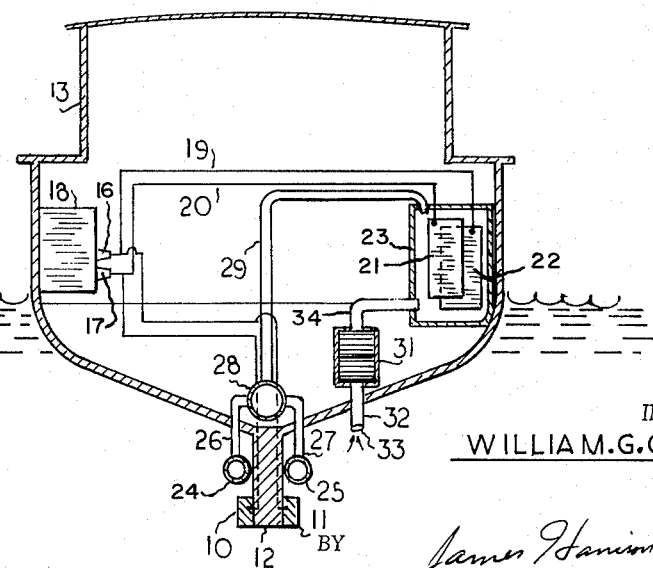
INVENTOR
WILLIAM.G.GREEN
ATTORNEY March 22, 1966        W. G. GREEN        3,241,512

ANTI-FOULING, BARNACLES, ALGAE, ELIMINATOR

Filed Feb. 12, 1964        3 Sheets-Sheet 2

INVENTOR
WILLIAM. G. GREEN

BY *James Harrison Bowen*

ATTORNEY

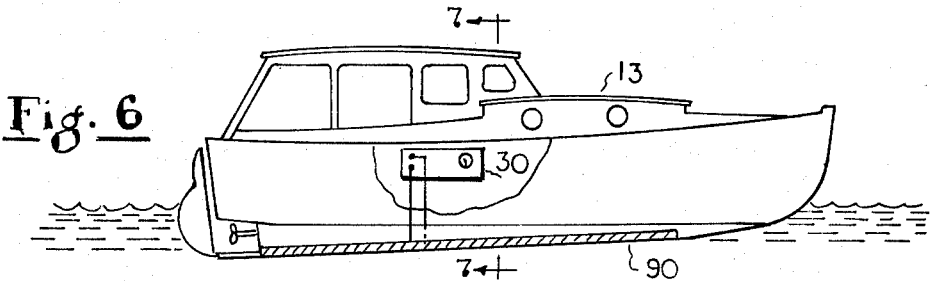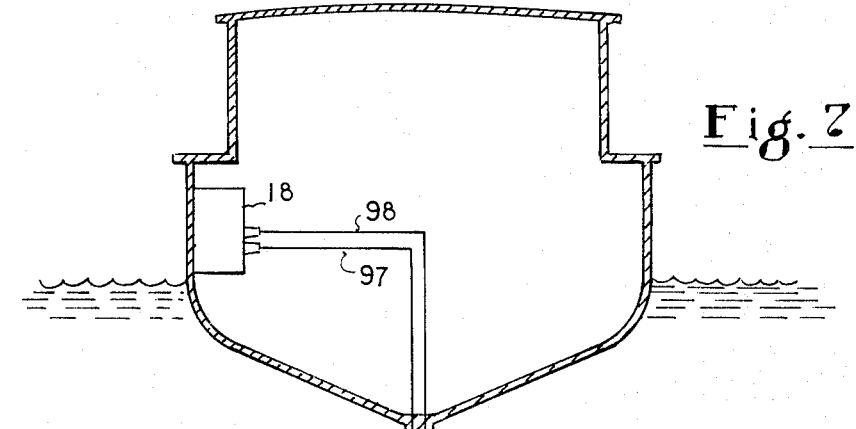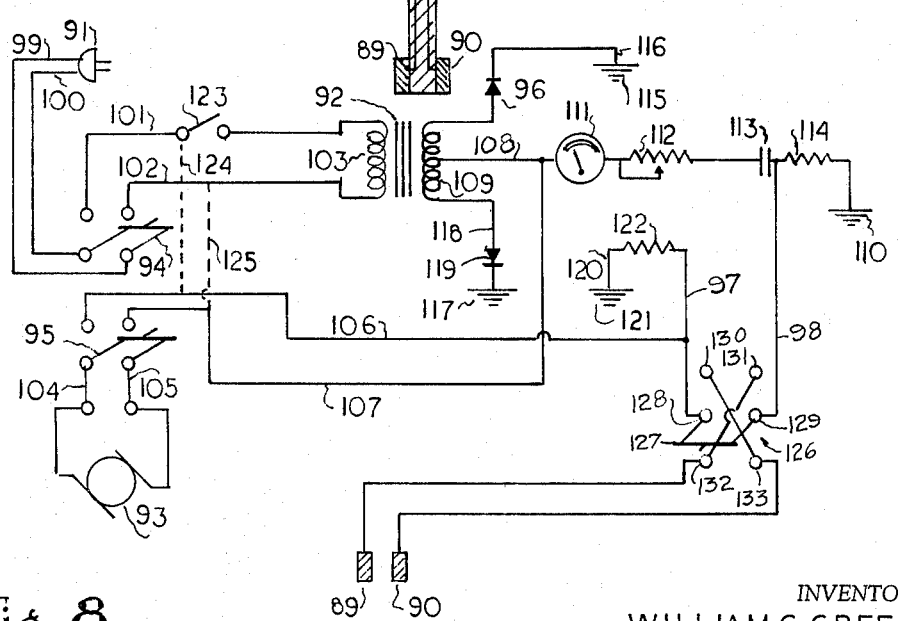

United States Patent Office 3,241,512
Patented Mar. 22, 1966

3,241,512
ANTI-FOULING, BARNACLES, ALGAE, ELIMINATOR
William G. Green, 4925 Camellia Way S., St. Petersburg, Fla.
Filed Feb. 12, 1964, Ser. No. 344,289
4 Claims. (Cl. 114—222)

The present invention relates to hull guard, barnacle, and algae eliminators and anti-fouling apparatus for boats, and the like, and in particular a pair of copper bus bars or electrodes, or a pair of perforated tubes, or both the electrodes and perforated tubes positioned on opposite sides of the keel of a boat whereby copper ions, chlorine gas or bubbles, or a combination of the ions and chlorine gas produce bubbles that float upward from the keel on both sides thereof following the contour lines of the boat hull cleaning the surface thereof and removing barnacles, algae, and other foreign and undesirable matter.

The purpose of this invention is to prevent fouling of hulls of boats, and the like.

The practical use of anti-fouling devices for boats, and the like, and furthermore the use of the hull-guard barnacle algae eliminator has demonstrated that the copper ions, or the chlorine, or the combination of the two, will kill bacteria, and I have recently shown that placing two copper electrodes along the keel of a boat, and energizing said electrodes with direct current of the order of .001 ampere per in.$^2$ of surface area, will cause to be formed a great many minute bubbles of gas, containing chlorine, hydrogen and oxygen, which float upward from the keel, on each side, following the contour lines of the boat, thus blanketing the underwater parts of the hull with an atmosphere of chlorine, and copper ions. This treatment has maintained the boat hull clean and free of barnacles, algae, moss, slime, and other marine growths, for a period of two years, with no sign of teredos, unusual electrolysis of other hull parts, or other damage.

Following the best electrolysis prevention practice, great care has been taken to provide a rectifier circuit with complete insulation, isolation from ground, or other circuits within the boat, thus holding the controlled electrolysis circuit unrelated to any metallic hull, engine, or other parts. No electrolysis of any kind has been observed, although many persons have predicted dire results from the use of the electrodes along the keel.

I have, therefore, developed a method in which the electrolysis takes place within a plastic tube, with sea water being pumped into the tube, and out and along perforated pipes on either side of the keel, thus releasing the copper ions, and the chlorine gas bubbles, through the perforations, to float up along the hull, as in the previously described system. Both systems perform identically.

Generating copper ions and chlorine gas, and releasing them underneath the hull of a boat so that they float up along the bottom contours to blanket the bottom with such gas and an atmosphere of copper ions, all as described and shown in the drawings, provides a smooth clean hull.

The object of this invention is to produce chlorine gas bubbles and metal ions in water below boat hulls and other marine installations, to kill barnacles, worms, algae and any other marine growths, fungi, and the like which may cause incrustations, moss, or other deleterious effects on speed, efficiency, or normal life expectancy of the hull or boat materials.

Another object of the invention is to provide means for producing chlorine gas bubbles, copper ions, and the like below the sides of the hull of a boat whereby the bubbles, ions, and the like float upwardly destroying all foreign matter on the surface of the hull.

A further object is to provide means for releasing chlorine gas bubbles, ions, and the like below outer surfaces of the hull, wherein said means is readily installed on opposite sides of the keel of a boat.

A still further object is to provide apparatus for producing chlorine gas bubbles, copper ions, and the like below the sides of the hull of a boat in which said apparatus is of simple and economical construction.

Other and further objects and advantages of the present invention will be apparent from the following detailed description, drawings and claims, the scope of the invention not being limited to the illustrations of the drawings as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

With these and other objects and advantages in view the invention embodies a pair of perforated tubes positioned on opposite sides of the keel of a boat with chlorine gas and metal ions supplied to the tubes and discharged from the perforations of the tubes providing screens of chlorine gas bubbles extended over the sides of the hull destroying barnacles, worms, algae, fungi and other marine growths and the like; and also wherein electrodes on opposite sides of the keel of a boat create chlorine bubbles which also form a curtain or screen that protects and preserves the boat hull.

Other features and advantages of the invention will be apparent from the following description taken in connection with the drawings, wherein:

FIGURE 1 is a side elevational view of a boat with part broken away showing a longitudinal section therethrough and showing, in particular one of the perforated tubes for releasing chlorine bubbles, and also showing a wiring diagram for supplying current to the electrodes.

FIGURE 2 is a cross section through the boat shown in FIGURE 1, being taken on line 2—2 thereof.

FIGURE 3 is a cross section through the boat, taken on line 3—3 of FIGURE 1, showing the relative positions of the spray headers electrodes, ion tank, pump, and battery or power supply.

FIGURE 6 is a side elevational view of a boat showing an electrode on one side of the keel of the boat.

FIGURE 7 is a cross section through a boat taken in line 7—7 of FIGURE 6 showing the electrodes on the keel of the boat.

FIGURE 8 is a view showing a wiring diagram including the electrodes and D.C. generator or alternator.

Figure 4:
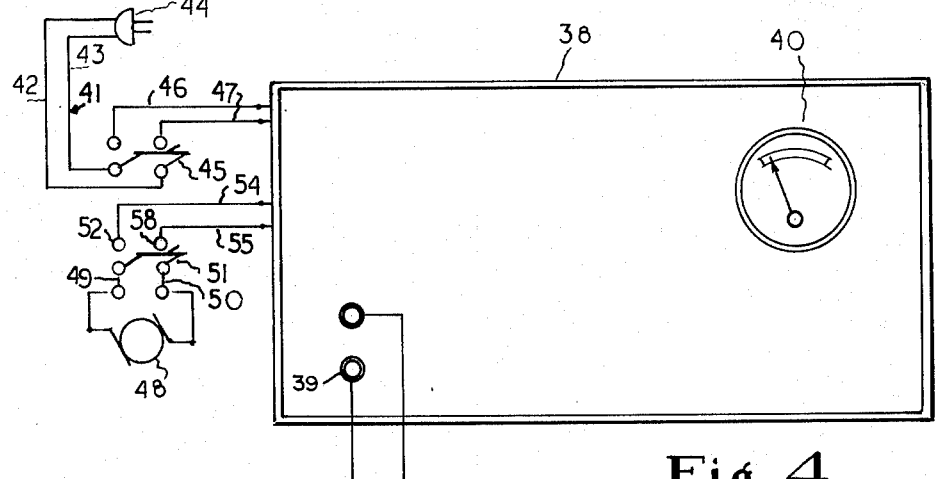
FIGURE 4 is a diagrammatic view showing a typical electric circuit for the D.C. generator or alternator.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numerals 10 and 11 refer to copper electrodes, bus bars, conductors, or the like on opposite sides of a keel 12 of a boat 13, and the electrodes are connected by leads 14 and 15 to terminals 16 and 17 of a battery or power supply 18, as shown in FIGURES 2 and 3. The power supply is also provided with leads 19 and 20 which extend from the terminals 16 and 17 to an anode 21 and a cathode 22 in the ion generator tank 23.

The purposes have been set forth by others and several U.S. patents have been granted, including Taylor, No. 2,435,986; Chappell, No. 3,010,886; Delius, No. 1,489,743; and Tatro, No. 1,489,798; but none of these have set forth dimensions or configurations which will meet the requirements for economical protection of a boat hull. For example, Tatro 67, No. 1,489,798, proposes to generate chlorine by electrolysis between anodes adjacent to pilings and a cathode in the water at a distant point. Inasmuch as the chlorine generated is proportioned to the current flow, and the conductivity of water obeys Ohm's law, the farther away the cathode is placed, the more power is consumed.

I have further found that any bare electrical conductors in the water may enter into combination with existing underwater metal parts of a boat, to increase the normal electrolysis therebetween, and this is enhanced or increased by the length of bare conductors and their configuration or placement with reference to such underwater parts. I have, therefore, determined that spacing of parallel conductors of + and − polarity should not exceed 6" or 8".

*Electrode spacing-voltage-and the like*

Electrodes of copper were used on the bottom of a 23′ V bottom boat-wood hull-covered with epoxy and Fiberglas. 12′ copper "bus bars" 1″ wide x ¼″ thick have been found adequate for 12 months service, at ½ ampere. Spacing was 4″. The bars were applied on either side of the 4″ keel, as shown. Spacing is not critical, but probably should not exceed 12″ on small vessels in salt water, or 4″ in fresh water. The lower limit of current has not been determined, but excellent results have been obtained using 1.0 amp., 0.5 amp. and 0.25 amp. Experience with metal in electrolysis cells indicates possibility that current density as low as 0.0006 amp./in.$^2$ should be sufficient for protection against barnacles, moss, and fungi on a 23-foot boat having a 7.5 foot minimum beam.

The above electrodes, which were operated at current density of 0.0023/5 amp./in.$^2$, for 8 months, appear to be less than ½ expended—therefore, with the life expectancy of the electrode at 16 months at 0.002325 amp./in.$^2$, the life would be extended to 64 months at 0.0006 amp./in.$^2$.

Electrodes of minus and plus polarity expend and foul differently. The negative electrode expends very much faster. Further, the negative electrode fouls with $Cu Co_4$ or $Cu Cl$ or both. Reversing the polarity will cause both electrodes to expend evenly, and to stay "clean." This precludes use of anodes and cathodes as such. Provision for converting A.C. or D.C. of proper voltage and current is made, as well as means for reversing current flow several times each 24 hours.

Battery power may be used for this purpose: if so the battery must not be "grounded" to engine or hull, as electrolysis would then be set up between engine fittings or hull, and other metal parts.

Since, in motion, no protection is necessary, due to velocity of water flow (see biological bulletin, vol. 90, No. 1, 51–70, February 1946, "Effect of Water Currents Upon the Attachment and Growth of Barnacles," by F. G. Walter Smith, Univ. of Miami Marine Laboratory). Protection is required only when the boat is at anchor or moored.

The keel may also be provided with perforated tubes 24 and 25 through which small chlorine bubbles escape to the surrounding sea water passing upwardly forming a screen or curtain over the outer surface of the hull of a boat, attacking barnacles, worms, sea growth and the like and leaving a clean surface of the hull.

The leading ends of the perforated tubes are connected by branch connections 26 and 27 to a header 28 in the hull of the boat, and the header 28 is connected by a pipe 29 to the ion generating tank 23. Sea water is pumped into the tank 23 by a pump 31, an intake 32 of which opens into the sea, as shown at the point 33 in FIGURE 3, and the discharge of which is connected to the tank 23 by tube 34. By this means sea water may be supplied by the pump, to the ion tank 23.

Figure 5:
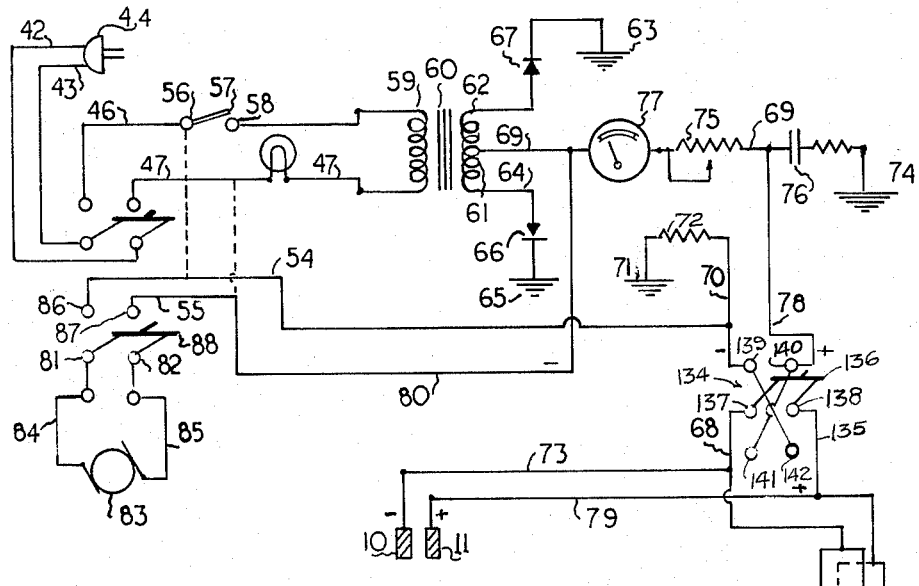
FIGURE 5 is a view showing a wiring diagram through which electric current is supplied to the electrodes.

In the design illustrated in FIGURES 4 and 5 a power unit 38 having a load indicator 39 and a gage 40, is provided with a D.C. generator or alternator having a cord 41 with wires 42 and 43 therein extended from a plug 44, by which the unit is connected to a power source, and the wires 42 and 43 are connected to terminals of a switch 45, the bars of which are positioned to contact terminals from which wires 46 and 47 extend into the power unit 38. The D.C. generator 48 of the power unit or alternator is connected by wires 49 and 50 to terminals of a switch bar 51. The switch bar is positioned to contact terminals 52 and 53 from which wires 54 and 55 extend into the power unit 38.

In the diagram shown in FIGURE 5 the wire 46 is connected to a terminal 56 of a single knife switch 57, and the other terminal 58 of the switch is connected to one end of the primary winding 59 of a transformer 60, the other end of the winding 59 being connected to the wire 47. One end of the secondary winding 61 of the transformer 60 is connected by a wire 62 to a ground 63, and the opposite end is connected by a wire 64 to a ground 65 through a rectifier 66. The wire 62 is also provided with a similar rectifier 67.

The wire 54 is connected by the wire 70 to the ground 71 through a resistance 72 and also to the switch 134. The circuit from the wire 54 extends through the switch 134 to the wire 68 and from the wire 68 to the electrode 10 through a wire 73.

The transformer 60 is also provided with a lead 69, which extends from the secondary winding 61 to a ground 74 through a variable resistance 75, condenser 76 and a gage 77, and the wire 69 is connected by a wire 78 to the switch 134 and through the switch to a wire 135. The wire 135 is connected by a wire 79, one end of which is connected to the electrode 11 and the other end to cathode 22. The wire 55 is connected by a wire 80 to the wire 69, and the D.C. generator 83 is connected to terminals 81 and 82 of the switch 88 by wires 84 and 85. The terminals 86 and 87 of the switch 88 are positioned to be engaged by the bar 88 of the switch.

The arrangement illustrated in FIGURES 6, 7 and 8 is similar to that shown in FIGURE 1, except that the perforated tubes 24 and 25 are omitted and electrodes 89 and 90 are secured directly to sides of the keel. Electric current is supplied to the electrodes from a plug 91 which may be plugged into any suitable electric light circuit of 110 v. A.C. current.

The circuit includes a transformer 92, a D.C. generator or alternator 93, switches 94 and 95, a rectifier 96, and conduits 97 and 98 connecting the electrodes 89 and 90 to wires 106 and 108 respectively.

The switch 94 is connected by wires 99 and 100 to the power supply through the plug 91, and the opposite terminals of the switch are connected by wires 101 and 102 to opposite ends of the primary winding 103 of the transformer 92. The switch 95 is connected to the alternator 93 by wires 104 and 105, and the opposite terminals of the switch are connected to wires 106 and 107, the wire 106 extending to the wire 97 and the wire 107 extending to a conduit 108 connecting the secondary winding 109 of the transformer 92 to a ground 110 through a gage 111, a variable resistor 112, a condenser 113, and a resistance 114. One end of the secondary winding 109 of the transformer 92 is connected to a ground 115 by a wire 116 through the rectifier 96 and the opposite end is connected to a ground 117 by a wire 118 through a rectifier 119. The wire 97 is also connected by a wire 120 to a ground 121 through a resistance 122.

A switch 123 may be provided across the wires 101, 106, and 107, as shown in FIGURE 8, the terminals being connected by wires 124 and 125.

The conduits 97 and 98 are connected by a double pole, double throw or clock operated relay 126 having a double knife bar 107 positioned to extend from center terminals 128 and 129 to terminals 130 and 131 on one side or to terminals 132 and 133 on the opposite side.

In the wiring diagram illustrated in FIGURE 5, electrodes 10 and 11, similar to the electrodes 89 and 90, are provided with a double pole, double throw or clock operated relay 134 connected across the conduits 70 and 78 through wires 135, 68, 73 and 79 with a double knife bar 136, hinged on center terminals 137 and 138 and positioned to contact terminals 139 and 140 on one side or 141 and 142 on the opposite side.

Inasmuch as electrodes furnished with direct current will collect mineral precipitate and salts on the negative pole, while remaining clean on the positive side, it has been found necessary to reverse the current polarity to the electrodes, periodically. This may be done by manual switches 126 and 134 or automatically by a timer operated relay.

With the parts designed and assembled as illustrated and described bus bars, electrodes or perforated tubes may be installed in spaced relation on the sides of the hull of a boat, or on piles, or other marine constructions, whereby metal ions, or chlorine gas or bubbles, may be provided around the hull of the boat, or around the piles or other constructions, or incrustations, providing a chlorine or metal ion saturated area destroying barnacles, worms, algae, fungi, other marine growths, and the like, making it possible to maintain clean and unobstructed areas continuously.

From the foregoing description, it is thought to be obvious that an anti-fouling, barnacle, algae, eliminator constructed in accordance with this invention is particularly well adapted for use, by reason of the convenience and facility with which it may be assembled and operated, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

What is claimed is:
1. An anti-fouling barnacle algae eliminator comprising elongated electrodes positioned on opposite sides of the keel of the hull of a boat, perforated tubes also positioned on opposite sides of the keel of the hull of the boat, and spaced from said electrodes, means for supplying current for generating copper ions from said electrodes to the electrodes, and means for supplying chlorine gas to said perforated tubes whereby chlorine bubbles and ions float upwardly providing a screen over the surface of the hull of the boat.

2. An anti-fouling barnacle algae eliminator comprising elongated electrodes positioned on opposite sides of the keel of the hull of a boat, perforated tubes also positioned on opposite sides of the keel of the hull of the boat and spaced from said electrodes, an alternator for supplying current for generating copper ions from said electrodes to the electrodes, and means for supplying chlorine gas to said perforated tubes whereby chlorine bubbles and ions float upwardly providing a screen over the surface of the hull of the boat.

3. In combination with an anti-fouling barnacle algae eliminator as described in claim 1, means for reversing the polarity of current supplied to the electrodes.

4. In a marine construction cleaning apparatus, the combination which comprises a pair of electrodes positioned in combination with said marine construction, a power supply for supplying electric current to said electrodes, means for reversing electric current supplied to said electrodes, a pair of perforated tubes also positioned to coact with said electrodes and spaced therefrom, and means for supplying chlorine gas to said perforated tubes.

References Cited by the Examiner

UNITED STATES PATENTS

| 820,105 | 5/1906 | Frazier | 204—197 |
| 843,357 | 2/1907 | Partee et al. | 204—147 |
| 872,759 | 12/1907 | Frazier | 204—147 |
| 994,405 | 6/1911 | James | 204—196 |
| 1,146,942 | 7/1915 | Landreth | 204—149 |
| 1,489,743 | 4/1924 | Delius et al. | 204—197 |
| 2,046,467 | 7/1936 | Krause | 204—149 |
| 2,138,831 | 12/1938 | Brammer | 114—222 |
| 2,976,226 | 3/1961 | Risberg | 204—196 |
| 3,010,886 | 11/1961 | Chappell | 204—149 |
| 3,069,336 | 12/1962 | Waite et al. | 204—196 |

FOREIGN PATENTS 1,133,962 7/1962 Germany.

MILTON BUCHLER, *Primary Examiner.*

FERGUS S. MIDDLETON, *Examiner.*